United States Patent [19]

Mehrotra et al.

[11] Patent Number: 5,632,941

[45] Date of Patent: May 27, 1997

[54] GROUP IVB BORIDE BASED ARTICLES, ARTICLES, CUTTING TOOLS, METHODS OF MAKING, AND METHOD OF MACHINING GROUP IVB BASED MATERIALS

[75] Inventors: Pankaj K. Mehrotra; Deepak P. Ahuja, both of Greensburg, Pa.; Holly S. Brooks, Morges, Switzerland

[73] Assignee: Kennametal Inc., Latrobe, Pa.

[21] Appl. No.: 425,163

[22] Filed: Apr. 20, 1995

Related U.S. Application Data

[62] Division of Ser. No. 60,772, May 10, 1993, Pat. No. 5,427,987.

[51] Int. Cl.$^6$ ................................ C04B 33/02
[52] U.S. Cl. ............... 264/656; 264/120; 264/125; 264/DIG. 36; 264/667; 501/87; 501/94; 501/96.3
[58] Field of Search .................. 501/94, 96, 87; 264/56, 65, 66, 120, 125, DIG. 36

[56] References Cited

U.S. PATENT DOCUMENTS

| | | | |
|---|---|---|---|
| 3,215,545 | 11/1965 | Reidl et al. | 106/55 |
| 3,305,373 | 2/1967 | Murata et al. | 106/55 |
| 3,649,312 | 3/1972 | Stibbs | 106/55 |
| 4,259,119 | 3/1981 | Watanabe et al. | 106/55 |
| 4,266,977 | 5/1981 | Steiger | 106/43 |
| 4,292,081 | 9/1981 | Watanabe et al. | 501/96 |
| 4,379,852 | 4/1983 | Watanabe et al. | 501/87 |
| 4,492,764 | 1/1985 | Watawabe et al. | 51/67 |
| 4,528,121 | 7/1985 | Matsushita et al. | 252/516 |
| 4,621,547 | 11/1986 | Yankoff | 82/1 C |
| 4,647,405 | 3/1987 | Debely | 252/518 |
| 4,863,490 | 9/1989 | Buljan et al. | 51/293 |
| 4,867,761 | 9/1989 | Brandt et al. | 51/309 |
| 4,873,053 | 10/1989 | Matsushita et al. | 419/11 |
| 4,876,227 | 10/1989 | DeAngelis | 501/97 |
| 4,876,941 | 10/1989 | Barnes et al. | 89/36.02 |
| 4,889,836 | 12/1989 | Buljan et al. | 501/97 |
| 4,910,171 | 3/1990 | Watanabe et al. | 501/87 |
| 4,925,346 | 5/1990 | Moskowitz et al. | 408/1 R |
| 4,931,413 | 6/1990 | Weir et al. | 501/31 |
| 4,933,308 | 6/1990 | Nishio et al. | 501/92 |
| 4,957,884 | 9/1990 | Knudsen et al. | 501/87 |
| 5,013,694 | 5/1991 | Holcombe et al. | 501/98 |

(List continued on next page.)

OTHER PUBLICATIONS

Siekmann, H. J., "How to Machine Titanium," The Tool Engineer, Jan. 1955, vol. 34, pp. 78–82.

Dearnley et al., "Evaluation of Principal Wear Mechanisms of Cemented Carbides and Ceramics Used for Machining Titanium Alloy IMI318," Materials Science and Technology, Jan. 1986, vol. 2, pp. 47–58.

Dearnley et al., "Wear Mechanisms of Cemented Carbides and Ceramics Used for Machining Titanium," High Tech Ceramics, ed. by P. Vincenzini, Elsevier Sci. Publ. (1987) pp. 2699–2713.

metals Handbook, Ninth Edition, vol. 16, Machining—"Machining of Reactive Metals," (1989) pp. 844–857.

Marchado et al., "Machining of Titanium and Its Alloys—A Review," Proc. Instn. Mech. Engrs., vol. 204 (1990) pp. 53–60.

"Kennametal Tools, Tooling Systems, and Services for the Global Metalworking Industry," Catalogue No. A90-41 (150) E1 (1991), p. 274.

Kertesz et al., "Machining Titanium Alloys with Ceramic Tools," Journal of Metals, May 1988, pp. 50, 51.

(List continued on next page.)

Primary Examiner—Ellis Robinson
Assistant Examiner—Timothy M. Speer
Attorney, Agent, or Firm—John J. Prizzi

[57] ABSTRACT

A densified titanium diboride based ceramic composition is provided having W and Co therein and a fine grain size. The composition has particular usefulness as a cutting tool for the machining of titanium based alloys at high speeds.

3 Claims, 5 Drawing Sheets

U.S. PATENT DOCUMENTS

| | | | |
|---|---|---|---|
| 5,017,217 | 5/1991 | Clere et al. | 75/244 |
| 5,019,540 | 5/1991 | Kuramoto et al. | 501/96 |
| 5,021,368 | 6/1991 | Hoffman et al. | 501/92 |
| 5,032,242 | 7/1991 | Knudsen et al. | 204/157.4 |
| 5,045,512 | 9/1991 | Lange et al. | 501/96 |
| 5,047,372 | 9/1991 | Parrish et al. | 501/87 |
| 5,059,563 | 10/1991 | Khazai et al. | 501/87 |
| 5,078,031 | 1/1992 | Buljan et al. | 82/1.11 |
| 5,100,845 | 3/1992 | Montgomery | 50/96 |
| 5,102,835 | 4/1992 | Saito et al. | 501/92 |
| 5,137,665 | 8/1992 | Tarry | 264/62 |
| 5,141,367 | 8/1992 | Beeghly et al. | 407/119 |
| 5,163,975 | 11/1992 | Martin | 51/293 |
| 5,180,533 | 1/1993 | Kamiya et al. | 264/65 |
| 5,185,112 | 2/1993 | Saito et al. | 264/63 |

OTHER PUBLICATIONS

Watanabe et al., "Recent Studies of Metal Borides," Bull. Jpn. Inst. Met., (1986) 25(12) 1018–1025 (translation pp. 1–22).

Brun et al., "Reactive Hot–Pressing Studies of High Density Oxide–Carbide Composite Ceramics," Refractory Metals & Hard Materials, vol. No. 2 (Dec. 21, 1992) pp. 75–82.

Watanabe et al., "Mechanical Properties of $TiB_2$–CoB–Metal Boride Alloys," Ceramic Bulletin, vol. 61, No. 9 (1982) pp. 970–973.

Jungling et al., "Pressureless Sintering of $TiB_2$–Fe Materials," PMI, vol. 23, No. 5 (1991) pp. 296–300.

"PAD $TiB_2$," (Sep. 13, 1989).

Dearnley et al., "Wear Mechanisms of Cemented Carbides and Ceramics Used for Machining Titanium Alloys," Mater. High Tech. Ceramics, pp. 2699–2712, (1987).

Israelsson, John, "Turning Inserts Take Off," Cutting Tool Engineering, Sep. 1993, pp. 36–40.

Metals Handbook, Ninth Edition, vol. 3, Properties and Selection: Stainless Steels, Tool Materials and Special–Purpose Metals, Amer. Society for Metals, Metals Park, OH 44073 (1980) pp. 451–457.

Hartung, P. D., and Kramer, B. M., "Tool Wear in Titanium Machining," Annals of the CIRP, vol. 31/1/1982, pp. 75–80.

GROUP IVB BORIDE BASED ARTICLES, ARTICLES, CUTTING TOOLS, METHODS OF MAKING, AND METHOD OF MACHINING GROUP IVB BASED MATERIALS

This is a divisional of application Ser. No. 08/060,772, filed on May 10, 1993, now U.S. Pat. No. 5,427,987.

BACKGROUND OF THE INVENTION

The present invention relates to Group IVB (titanium, hafnium, zirconium) boride based articles, cutting tools and their densification techniques. It is especially related to titanium diboride based cutting tools and their use to machine Group IVB metals and alloys, especially titanium and its alloys.

It was recognized as early as 1955 that "machining of titanium and its alloys would always be a problem, no matter what techniques are employed to transform this metal into chips," (Siekmann, H. J. Tool Engng, Jan. 1955, Vol. 34, Pages 78–82).

Over approximately the past forty years, commercial machining technology for most workpiece materials has advanced significantly. Ceramic, cermet and ceramic coated cutting tools have been developed and commercialized which have significantly improved productivity in machining of steels, cast irons and superalloys. However, during that same time period, progress in the field of machining titanium alloys has been minor. The commercial cutting tool materials of choice for most titanium machining applications remain high speed tool steels and an uncoated, approximately 6 weight percent cobalt cemented tungsten carbide, such as Kennametal K313 cemented carbide grade. Where coated cemented carbide tools (e.g., Kennametal, KC720 and KC730 grades) have been applied to titanium alloy machining, they have met with only limited success. The use of uncoated cemented carbides to machine titanium based metallic materials has greatly limited productivity advances in the machining of these materials, since uncoated carbides are limited in most commercial applications to speeds of 250 surface feet/minute or less when machining titanium alloys (see Dearnley et al., "Evaluation of Principal Wear Mechanisms of Cemented Carbides and Ceramics used for Machining Titanium Alloy IMI318," Materials Science and Technology, January 1986, Vol. 2, Pages 47–58; Dearnley et al., "Wear Mechanisms of Cemented Carbides and Ceramics used for Machining Titanium," High Tech Ceramics, ed. by P. Vincenzini, Elsevier Sci. Publ. (1987) Pages 2699–2712; Metals Handbook, Ninth Edition, Vol. 16, "Machining," (1989), Pages 844–857; Marchado et al., "Machining of Titanium and Its Alloys—A Review," Proc. Instn. Mech. Engrs., Vol. 204 (1990) Pages 53–60; and "Kennametal Tools, Tooling Systems and Services for the Global Metalworking Industry," Catalogue No. A90-41(150)E1; (1991) Page 274.

Kennametal, KC, K313, KC720 and KC730 are trademarks of Kennametal Inc., of Latrobe, Pa., for its cutting tool grades.

The machining speed used when machining titanium alloys with uncoated cemented carbide tools may be increased to 500 to 1000 surface feet/minute, through the use of a high pressure coolant machining system (e.g., U.S. Pat. No. 4,621,547). These systems are expensive, difficult to integrate into existing machine tools, and require a significant amount of maintenance. Their application in titanium alloy machining has, therefore, been limited.

Clearly, there has thus been an unfulfilled long-felt need for improved cutting tool materials, and improved methods for machining titanium based metallic materials.

SUMMARY OF THE INVENTION

The present inventors have now surprisingly discovered a new cutting tool material for machining titanium based metallic materials, which significantly advances titanium machining productivity and fulfills the long-felt need identified above. Applicants have found that the present invention may be utilized in the machining of a titanium alloy at a metal removal rate of about two to three times that obtained with uncoated carbide cutting tools using flood cooling while maintaining about the same amount of metal removed per cutting edge. This results in a significant reduction in the labor time required to machine a given titanium alloy workpiece while significantly increasing machine availability. These results are achieved using standard flood cooling techniques. The present invention, therefore, has the further advantage that it does not require the use of a high pressure coolant system to achieve high machining speeds.

According to one aspect of the present invention, a method of chip forming machining (e.g., turning) of a titanium alloy is provided in which cutting is performed at a speed of at least 400, and more preferably, at least 500, surface feet/minute with a cutting tool preferably having a cutting edge lifetime of at least three minutes, while using flood cooling.

According to another aspect of the invention, a metalcutting tool for chip forming machining of Group IVB (Ti, Hf, Zr) metallic materials is provided which has a rake face, over which chips of the Group IVB metallic material will flow during machining, a flank face and a cutting edge for cutting into said Group IVB materials at high speeds ($\geq 400$ surface feet/minute). This metalcutting tool has a Group IVB boride based (i.e., at least 60 w/o Group IVB borides) composition which, preferably, is a ceramic composition having a Group IVB boride phase, and preferably a second phase preferably formed as a residue of a sintering aid and the Group IVB boride phase.

Preferably, the ceramic contains one or more phases of: $N_{xn}M_{yn}$ boride, where $x_n > y_n$, $y_n > 0$, n is an integer $\geq 1$, N is titanium, hafnium or zirconium, alone or in solid solution with each other, and M may include W, Co, Mo, Ta, Nb, Fe, Ni, Al and/or Cr, but is preferably W and/or Co. Preferably, the $N_{x1}M_{y1}$ boride phase includes a diboride, and more preferably, a $Ti_{x1}m_{y1}B_2$ phase, and most preferably, $TiB_2$ crystal structure as determined by x-ray diffraction of the densified ceramic.

In a preferred embodiment in accordance with the present invention, the Group IVB boride based densified ceramic composition has a microstructure including a $N_{x1}M_{y1}$ boride phase as described above, and having a second phase containing N and M (e.g., $N_{x2}M_{y2}$ Z, where Z may be boron, or a borocarbide, boroxide, boronitride, borocarbonitride, oxyborocarbonitride boroxycarbide or boroxynitride). Preferably, a third phase also containing N and M (e.g., $N_{x3}M_{y3}Z$) is also present. Preferably, the ratio of $y_2/x_2$ in the second phase is greater than the ratio of $y_3/x_3$ in the third phase, which is, in turn, preferably greater than $y_1/x_1$ in the first phase. M may be any of the elements mentioned above with respect to the first boride phase, but preferably includes tungsten and/or cobalt. Preferably, the second and third phases form a matrix in which the $N_{x1}M_{y1}$ boride phase is embedded. In many instances, the second phase is present as a halo around the $N_{x1}M_{y1}$ boride phase with the third phase outside of the second phase.

Minor phases that may be found in the microstructure of the present invention in addition to those already discussed include $CoW_2B_2$, $CoWB_5$, $WB$, $W_2B$, $W_3CoB$, $TiB$ and $Ti_3B_4$.

It should be understood that the phases mentioned above may also contain minor amounts of oxygen, carbon, nitrogen, and other elements from sintering aids, toughening agents, grain refining agents and impurities.

The foregoing densified ceramic, in addition to its use as a cutting tool in the high speed machining of reactive metals (i.e., Ti, Hf, Zr) and their alloys, may also be used to cut other materials (e.g., aluminum and aluminum alloys, and hardened steels and hardened cast irons), and may be used for non-cutting applications, as well. Such non-cutting applications include articles for handling, or which come into contact with, liquid metals, such as aluminum (e.g., boats, crucibles and electrodes) as well as plungers and dies for forming sheet metal articles, such as cans.

According to another aspect of the present invention, a process is provided for manufacturing the above titanium diboride based article of manufacture. This process includes the steps of adding to a $TiB_2$ powder an effective amount of Co and WC to substantially densify (i.e., at least 97% of theoretical density) the material during sintering. It has been found that, when Co and WC are added together to the present composition in an effective amount, they provide a combination of improved densification to the composition, while providing a fine grain size in the densified material. Preferably, the sum of WC+Co is at least 2.5 w/o, and more preferably, at least 3 w/o if the material is to be densified by uniaxial hot pressing. If the material is to be densified by cold compaction, followed by sintering, preferably the sum of Co+WC should be at least 3 w/o, and more preferably, at least 3.5 w/o, to assure that adequate densification (i.e., at least 97% of theoretical density) takes place at temperatures of about 2200° C. or less. As the content of WC+Co in the present invention increases significantly above about 12 w/o, its wear rate when machining titanium alloys also increases. Therefore, it is preferred that the WC+Co content be minimized to avoid excessive wear rates. Preferably, WC+Co content should be less than about 12 w/o, and more preferably, less than 10 w/o.

In accordance with one preferred embodiment of the present invention, about 3.0 to 10 weight percent of WC+Co are added to the $TiB_2$ powder (or, alternately, $ZrB_2$, $HfB_2$, or their solid solutions with each other and/or $TiB_2$) and mixed together to form a mixture. Preferably, 0.25 to 1 v/o BN may also be added to further control grain growth. The powder mixture is then pressed, preferably at room temperature, to form a compact. The compact is then sintered at a pressure up to 30,000 psi to produce a substantially fully dense (i.e., at least 97% dense) article of manufacture, preferably having an average grain size of 8 µm, or less, more preferably, 6 µm or less, and most preferably, 4 µm or less.

These and other aspects of the present invention will become more apparent upon review of the figures briefly described below in conjunction with the detailed description of the invention which follows.

DETAILED DESCRIPTION OF THE INVENTION

Figure 1:
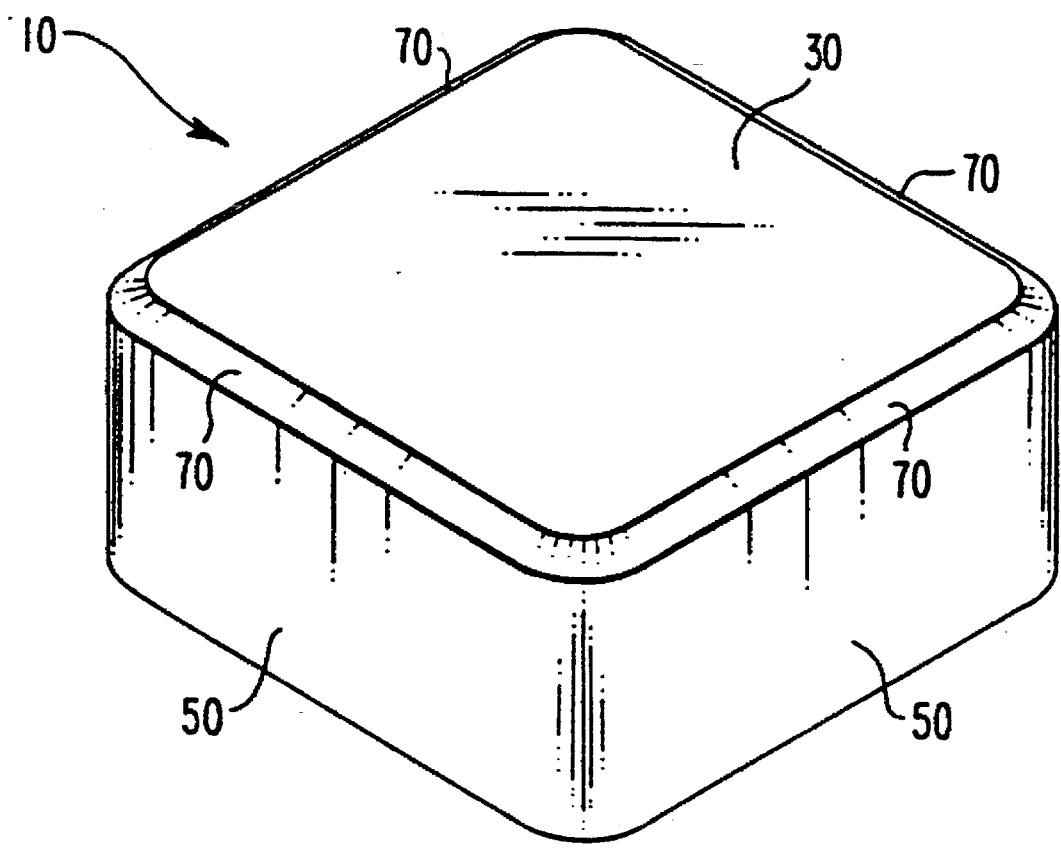
FIG. 1 shows an embodiment of a cutting tool in accordance with the present invention.

A preferred embodiment of an article of manufacture in accordance with the present invention is shown in FIG. 1. While the present invention may find use in many applications, the present inventors have found it to be particularly useful as a cutting tool.

FIG. 1 shows an embodiment of an indexable metalcutting insert 10 composed of the ceramic material discovered by the present inventors. The present invention is preferably used in the high speed ($\geq 400$ surface feet/minute) chip forming machining (e.g., turning, milling, grooving, threading, drilling, boring, sawing) of Group IVB metallic materials (i.e., zirconium and its alloys, titanium and its alloys, and hafnium and its alloys). The inventors have found the present invention to be particularly useful in the high speed machining of titanium alloys. Preferably, the speed should be at least 500 sfm, and preferably, 1,000 sfm or less, to obtain the most advantageous use of the present invention when machining these materials. Preferred feed rates contemplated for machining titanium alloys are 0.002 to 0.015 inch/revolution, and more preferably, 0.002 to 0.010 inch/revolution. Preferred depths of cut contemplated for machining titanium alloys are about 0.01 to about 0.2 inch, and more preferably, about 0.01 to about 0.15 inch.

The cutting tool 10 has a rake face 30 over which chips formed during said high speed machining of a Group IVB metallic material flow. Joined to the rake face 30 is at least one flank face 50. At at least one juncture of the rake face 30 and flank faces 50, a cutting edge 70 is formed, for cutting into the Group IVB metallic material.

While the cutting edge 70 may be in a sharp, honed, chamfered, or chamfered and honed condition, it is preferred that it be in a chamfered condition, an embodiment of which is illustrated in FIG. 1.

Preferably, the cutting insert 10 has a cutting edge lifetime of at least 3 minutes, and more preferably, at least 5 minutes during the high speed machining (e.g., turning) of a titanium alloy. In addition, the tool in accordance with the present invention has a maximum flank wear rate preferably no greater than one-half, and more preferably, no greater than one-third that of an uncoated cemented carbide tool when machining (e.g., turning) a titanium alloy under the same high speed cutting conditions, including flood cooling.

Figure 2:
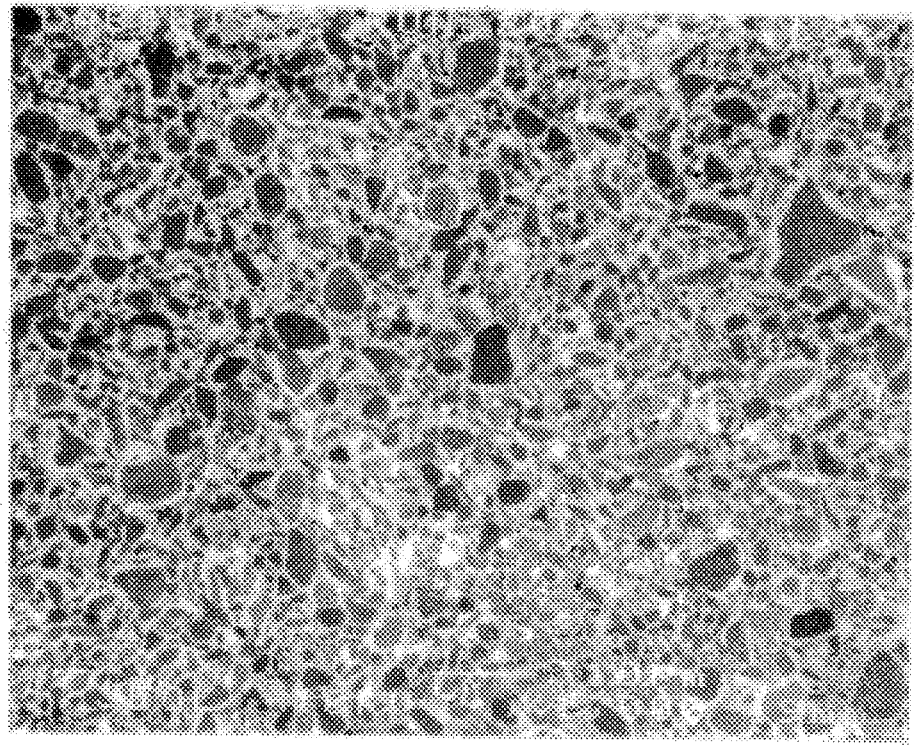
FIG. 2 shows an embodiment of the microstructure of the present invention as obtained by a scanning electron microscopy back scattered imaging technique.
Figure 3:
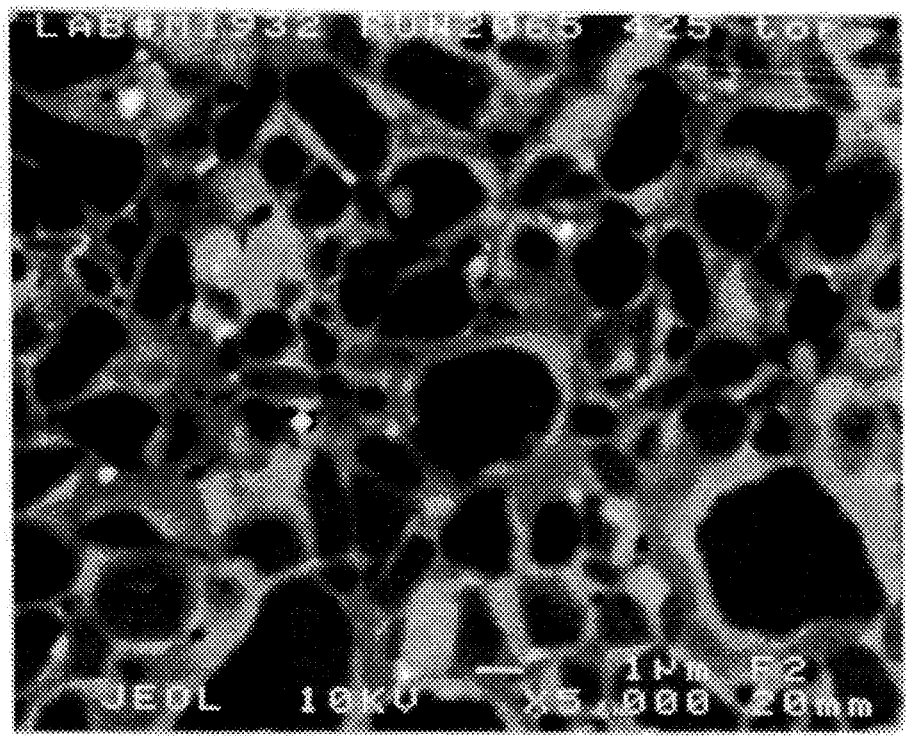
FIG. 3 shows an embodiment of the microstructure of the present invention at five times the magnification used in FIG. 2.

The cutting tool shown in FIG. 1 is, preferably, composed of the $TiB_2$ based ceramic material in accordance with the present invention. FIGS. 2 and 3 show typical microstructures of a preferred embodiment (see Example No. 1, Table I) of the present invention at two different magnifications. From FIG. 2, it can be seen that the grain structure is substantially fine and uniform, with an average grain size estimated to be about 4 μm. It can be most clearly seen in FIG. 3 that the grain structure is typically characterized by a dark central phase, or central portion, which may, preferably, be $TiB_2$ or $Ti_{x1}M_{y1}B_2$, where M may preferably include W and/or Co and $y \leq 0$. This first phase appears to be embedded in a matrix composed of a second, and possibly, a third phase. In many instances, adjacent to and substantially surrounding the central grain is a light gray second phase which is believed to be composed of a $Ti_{x2}M_{y2}Z$ phase, where $x_2>y_2$ and $y_2>0$, $y_2/x_2>y_1/x_1$ and M preferably includes W and/or Co. Around many of these phases is a third phase which is of a shade of gray intermediate that of the central portion and the second phase. This third phase is believed to be composed of a $Ti_{x3}M_{y3}Z$ phase, where $My_3$ is preferably W and/or Co and where $x_3>y_3$, $y_3>0$ and $y_2/x_2>y_3/x_3>y_1/x_1$ (e.g., the second phase has a greater concentration of tungsten in it than the third phase matrix). The concentration of titanium, however, is preferably greatest in the central portion of the grain. X-ray diffraction analysis has also shown that the major phase(s) present is of the $TiB_2$ type crystal structure; however, because of the lack of sensitivity of x-ray diffraction to minor levels of phases and minor levels of solid solutioning, it is unclear, based on x-ray diffraction alone, as to what minor phases or solid solutions may be present.

It is also unclear from the x-ray diffraction work alone what phases form the second and third phases mentioned above. However, since from the photomicrographs there appears to be substantial amounts of the second and third phases present, their absence from the x-ray diffraction studies done is believed to be explainable if these phases are also $Ti_{xn}M_{yn}B_2$ (i.e., $Z=B_2$) phases containing minor amounts of W and/or Co in solid solution (e.g., $Ti_{x2}W_{y2}B_2$ and $Ti_{x3}W_{y3}B_2$). In this case, their absence from the x-ray diffraction trace would be explained by the almost identical lattice constants they would have with $TiB_2$. That is, the $TiB_2$ peaks are substantially identical to, and therefore mask, the peaks of the second and third phases.

While it is believed that the phases forming the halos about the first phase (see FIG. 3) are diborides, they may also possibly contain minor amounts of, boroncarbide, boronitride, boronoxide, borocarbonitride, boroxycarbide, boroxynitride or a boroxycarbonitride; however, this has not been confirmed. What appears to be definite, however, is that the inner halo, or second phase, has a greater concentration of tungsten than the outer halo, or third phase, and all three phases contain titanium as the major metallic element present.

In addition to the $TiB_2$ phase observed by x-ray diffraction, other phases that have been at times observed in minor amounts by x-ray diffraction include $CoW_2B_2$, $CoWB_5$, WB, $W_2B$, $W_3CoB$, TiB and $Ti_3B_4$. The white phase visible in FIG. 3 is believed to be one of the tungsten rich phases mentioned above. The black spots shown in FIG. 3 are believed to be porosity.

In the alternative, similar compositions may be made based on $ZrB_2$ or $HfB_2$, or their mixtures and solid solutions with each other or $TiB_2$. These compositions are less preferred than the $TiB_2$ based composition described above because of their higher cost. In general, therefore, it can be stated that the present invention includes a densified composition, including a first metal diboride phase having a first metal selected from the group of titanium, hafnium and zirconium alone, or in combination with each other, and optionally in combination with W and/or Co, and preferably a second metal diboride phase having a metal which includes W and/or Co, in combination with Ti, Hf and/or Zr. Mo, Nb, Ta may be partially or wholly substituted for the W in the material, while iron and/or nickel may be partially or wholly substituted for the Co in the material. In addition, W, Mo, Al and/or Cr may be partially substituted for the cobalt in the material.

The densification of the present invention may be achieved either by hot pressing a blend of the appropriate powders or by cold pressing the blended powders to form a compact which is then sintered and hot isostatically pressed.

These processes will be illustrated by the following discussion directed to $TiB_2$ based compositions, but it should be understood that the techniques described are also applicable to $ZrB_2$ and $HfB_2$ based compositions and their mixtures and solid solutions with each other and/or $TiB_2$ in accordance with the present invention.

In accordance with the present invention, a blend of powders is prepared, composed of at least 60 w/o; preferably, at least 75 w/o; more preferably, at least 85 w/o; and most preferably, at least 90 w/o $TiB_2$.

It is preferred that the level of $TiB_2$ utilized should be as high as possible commensurate with the ability of the composition to be densified by either the hot pressing or the cold pressing-sinteringhot isostatic pressing route in order to achieve the high wear resistance while machining titanium alloys. Applicants have found that $TiB_2$ has excellent resistance to reactivity with titanium during titanium alloy machining and has good thermal conductivity compared with other ceramics; however, it is very difficult to densify, while maintaining a fine grain size.

Applicants have surprisingly discovered that $TiB_2$ based ceramics can be readily densified if WC and Co are added to the $TiB_2$ powder blend. The WC and Co may be added: (1) directly as individual WC (or W and C) and Co powders; or (2) as a result of the attrition of the cemented WC-Co milling media during milling of the $TiB_2$ powder; (3) as a cemented WC-Co powder; or (4) by a combination of (1), (2) and/or (3). At least 2.5 w/o total of WC+Co should be added to the $TiB_2$ powder to assure densification at 2000° C. or less in hot pressing. Where densification is to be achieved by cold compaction-sintering and hot isostatic pressing, it is preferred that there be at least 3.0 w/o total of WC+Co.

While not optimized, the inventors have found that the ratio of W/Co on a weight percent basis may be about 9:1 to about 20:1. It has been found that the addition of the combination of Co and WC in the minimum amounts indicated significantly improves the ease with which densification is achieved, without an adverse effect on the grain size of the resulting material. It is believed that this effect is due to a low melting point eutectic alloy formed by the WC and Co during the sintering process. It is, therefore, believed that W/Co ratios as low as 1:20 may also be useful and may result in a further lowering of the sintering or hot pressing temperatures required to achieve substantial densification. The total WC+Co addition preferably should be less than about 12 w/o, and more preferably, less than 10 w/o, since increasing WC+Co content increases the observed wear rate during the high speed machining of titanium alloys.

The inventors have also found that the grain size of the densified article may be further controlled by the addition of an effective amount of a grain growth inhibitor to the powder blend. The inventors, therefore, prefer to add BN powder to the blend at a preferred level of about 0.25 to 1.0 v/o of the powder blend.

Limited amounts (not exceeding about 35 v/o total) of other elements and/or compounds may be added to the powder blend to improve various properties of the material for specific applications. Such additions that are now contemplated may include: (1) TiC, ZrC, $B_4C$, TaC and $Mo_2C$ to improve wear resistance; (2) TiN, TiC to assist in densification. Hafnium diboride and/or zirconium diboride may also be substituted for $TiB_2$ to improve wear resistance, preferably, the total content of $HfB_2$ and $ZrB_2$ in the composition is also held below 35 v/o. It is also contemplated that a portion of the Co addition may be partially replaced by, or supplemented by, small amounts of W, Fe, Mo, Ni, Al and Cr, and totally replaced by Fe and/or Ni.

Fracture toughness may be further improved through the use of starting powders having an elongated or whisker morphology. For example, some of the $TiB_2$ starting powder may be replaced by $TiB_2$ whiskers, or SiC, $B_4C$, TiC, ZrC, TaC or $Mo_2C$ may be added as elongated particles or whiskers.

The foregoing powders are preferably blended for a time appropriate to provide the desired pick up in WC and Co from the WC-Co cemented carbide milling media. Preferably, at least about 2.5 w/o of WC+Co is added to the blend in this manner.

The blended powder is then densified. If it is densified by uniaxial hot pressing, then the hot pressing temperatures and pressures used are preferably about 1800°–2000° C. and about 1 to 5 Ksi, and more preferably, 1 to 2 Ksi. It is desirable that the hot pressing temperature be minimized to minimize grain growth. In order to achieve maximum densification during hot pressing, the pressure should be maintained sufficiently low during temperature elevation to allow gases generated during heat-up to escape. After these gases have escaped, the full hot pressing pressure may then be applied.

Alternatively, the powder blend may also be densified by cold compaction to form a green compact, followed by sintering, preferably at 1800°0 to 2200° C., preferably followed by hot isostatic pressing, preferably at 1700° to 2100° C., and up to 30,000 psi using argon or helium or other inert gas, but not nitrogen. This manufacturing route is preferable over the hot pressing route if equivalent levels of densification and a fine grain size can be achieved for a given composition, since the cutting and grinding of a hot pressed ceramic billets is avoided, thereby reducing the manufacturing cost.

The inventors believe that the grain size in the densified article is very important to achieving the best metalcutting properties and, therefore, prefer that the average grain size be 8 μm, or less, more preferably, 6 μm, or less, and most preferably, 4 μm or less. The inventors believe that a fine grain size is important because $TiB_2$ has a very high modulus of elasticity, E, and an anisotropic thermal expansion coefficient, e, which would tend to reduce the thermal shock resistance of a ceramic containing large $TiB_2$ grains. The inventors, however, believe that they have minimized any adverse consequences of these properties by maintaining the fineness of the grains, as described above, which are believed to be substantially randomly oriented.

The resulting articles made in accordance with the present invention preferably have a Rockwell A room temperature hardness of about 94.3 to 96.5, more preferably, about 94.7 to 96.0, and most preferably, 95.0 to 96.0. Their density is, preferably, at least 97%, and more preferably, at least 98% of the theoretical calculated density. The $K_{IC}$ (Evans & Charles) fracture toughness of these articles is difficult to measure, but is estimated to be (using 300 to 500 gm loads), by the Palmqvist indentation method of fracture toughness measurement, about 3.5 to about 4.5 $MPam^{1/2}$. Despite this low mechanical fracture toughness, the articles in accordance with the present invention have been surprisingly found to have excellent toughness during the turning of a titanium alloy as described in the examples which follow. These examples are provided to further illustrate the significant benefit provided by the present invention in the high speed machining of titanium alloys.

In accordance with the present invention, articles were made of the compositions shown in Table I.

TABLE I

| Example No. | Starting Material* | Milling Time (minutes) | After Milling Total WC + Co (w/o) | Hot Press Temp (°C.)/ Press.(Ksi) | Density (g/cc) | Density as % of Calc. Theoretical Density | Rockwell A Hardness (R.T.) | Grain Size Range (μm) |
|---|---|---|---|---|---|---|---|---|
| 1. | .25 v/o BN + .63 v/o WC + .07 v/o Co | 50 | 4.3 | 1900/1 | 4.619 | 99 | 95.2 | 1–6 |
| 2. | .25 v/o BN | 120 | 5.1 | 1850/1 | 4.554 | 98 | 95.5 | 1–7 |
| 3. | .25 v/o BN | 120 | 5.1 | 1900/1 | 4.611 | 99 | 94.9 | nm |
| 4. | .25 v/o BN + 1.28 v/o WC + .15 v/o Co | 50 | ≅7[1] | 1900/1 | 4.662 | 99 | 95.2 | 0.5–7 |
| 5. | .25 v/o BN | 45 | 2.5 | 1900/1 | 4.489 | 98 | 94.5 | 2–17 |
| 6. | .25 v/o BN + 2 v/o WC + 0.08 v/o Co | 50 | ≅9.2[1] | 1900/1 | 4.689 | 98 | 95.4 | 1–8 |
| 7. | .63 v/o WC + .07 v/o Co | 50 | ≅4.31 | 1900/1 | 4.589 | 99 | 95.5 | 1–10 |

*Remainder $TiB_2$ and impurities
[1]estimated

The titanium diboride starting powder used was Grade F obtained from Hermann C. Starck Berlin GmbH & Co. KG, P.O.B. 1229, D-7887 Laufenburg/Baden, Germany. This powder is composed of crushed and milled irregular shape particles having an hexagonal crystal structure. The specification, along with an example of the actual properties for this grade of $TiB_2$ powder, are shown in Table II.

TABLE II

| Specification | Measured Property |
|---|---|
| BET Specific Surface Area >4 $m^2/g$ | 4. $m^2/g$ |
| Scott TAP Density/Apparent Density— | 9.2 $g/in^3$ |
| FSSS Particle Size max. 0.9 μm | 0.9 μm |
| Max. Particle Size 98% <6 μm | — |
| Ti ≧66.5 wt. % | remainder |

TABLE II-continued

| Specification | Measured Property |
|---|---|
| B ≧28.5 wt. % | 29.8 |
| Nonmetallic Impurities | |
| C ≦0.25 wt. % | 0.21 |
| O ≦2.0 wt. % | 1.92 |
| N ≦0.25 wt. % | 0.11 |
| Metallic Impurities | |
| Fe ≦0.25 wt. % | 0.18 |
| Other - Total ≦0.2 wt. % | <0.2 |

The boron nitride starting powder was obtained from Union Carbide as grade HCP.

| The WC powder had the following properties: | | | |
|---|---|---|---|
| Total Carbon | 6.11 w/o | Cr | .01 W/o |
| Free Carbon | .01 w/o | Ta | .12 w/o |
| O$_2$ | .17 w/o | Ca | .21 w/o |
| Ni | .01 w/o | Fe | .02 w/o |
| | | BET | 1.36 m$^2$/g |

The cobalt powder was an extra fine grade cobalt.

These powders were milled together in the ratios shown in Table I to form 100 gm lots. Wet milling was performed in a polyurethane lined ball mill with isopropanol and about 3900 gm of WC-Co cemented carbide cycloids for the times shown in Table I. These cemented carbide cycloids have a nominal composition containing about 5.7 w/o Co, 1.9 w/o Ta and a nominal Rockwell A hardness and nominal magnetic saturation value of about 92.7 and about 92 percent, respectively.

From our experience in milling these powders under the conditions described, it is estimated that, for a milling time of 45 to 50 minutes, about 2.4 to about 2.7 w/o of WC+Co, and for a milling time of 120 minutes, about 4.1 to about 5.8 w/o WC+Co, is added to the blend due to the attrition of the WC-Co cemented carbide cycloids during milling.

After milling, powder blends were dried, screened and then uniaxially hot pressed according to the conditions shown in Table I in an argon atmosphere. During heating, pressure was not applied. The pressing pressure was first applied at the hot pressing temperature and held for typically one hour. The resulting articles produced were essentially fully dense and have the densities, hardnesses and grain sizes shown in Table I. Billets made in accordance with Example 1 were cut and ground to produce SNGN-453T (0.002-0.004 inch×20° chamfer) style indexable metalcutting inserts (see FIG. 1).

Figure 4:
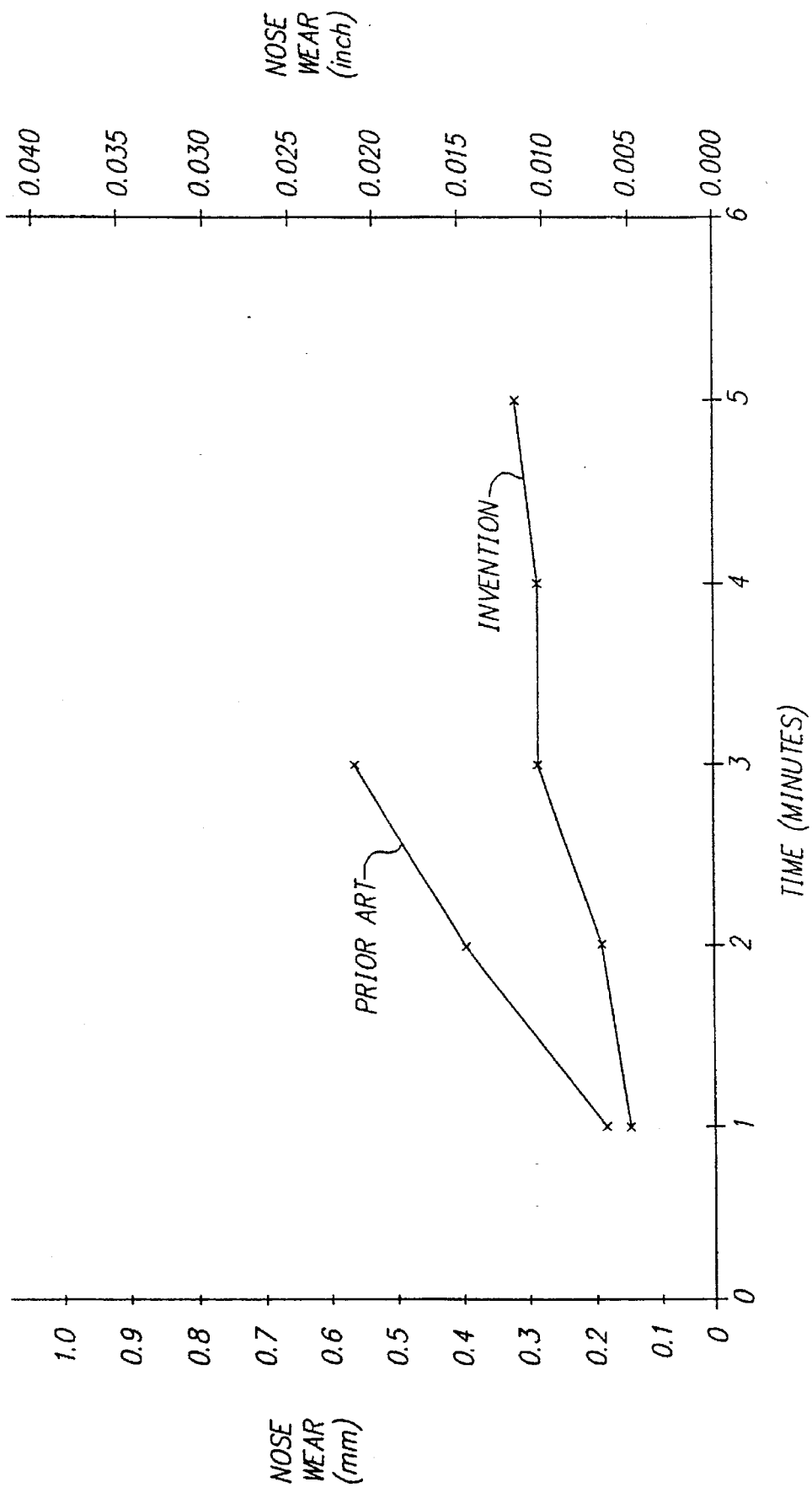
FIG. 4 is a graph of nose wear against cutting time for the present invention and a prior art uncoated cemented carbide tool during the turning of a Ti-6Al-4V alloy.
Figure 5:
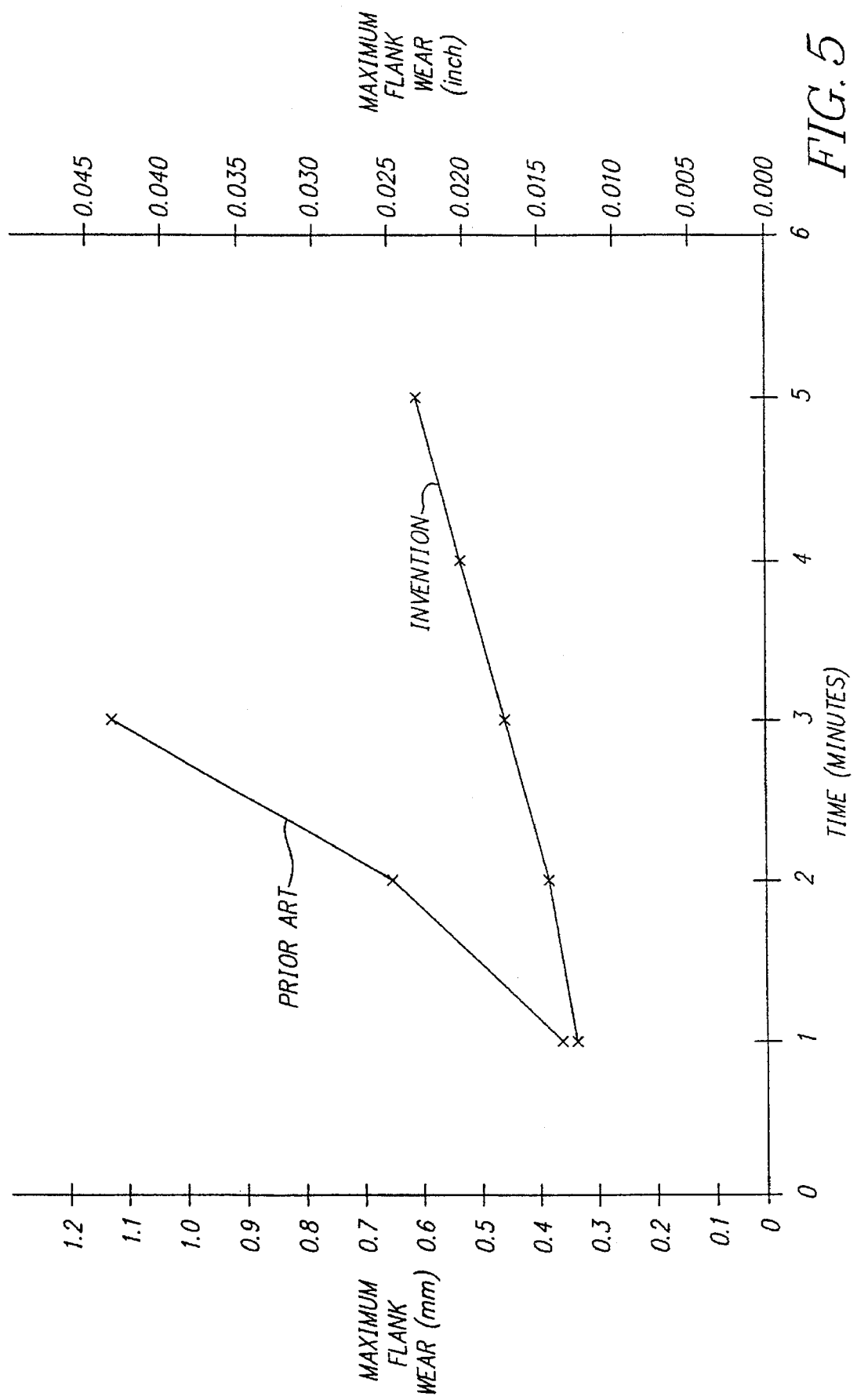
FIG. 5 is a graph of maximum flank wear as a function of cutting time in the turning of a Ti-6Al-4V alloy for the present invention and a prior art uncoated cemented carbide.

These inserts were tested in the metalcutting tests described below in Table III against prior art sharp edged K313 grade cemented carbide SNGN-433 style cutting inserts. These tests were run under flood coolant at 600, 800 and 1,000 surface feet/minute, 0.005 ipr and 0.050 inch depth of cut as described in Table III. The cutting tools composed of material in accordance with the present invention had more than twice the life of the prior art cemented carbide tools. It was observed that chemical reaction between the titanium alloy workpiece and the cutting tool according to the present invention was the dominant wear mechanism on the rake and flank faces. The present invention, however, had a significantly lower wear rate than the prior art tool, as illustrated by the graphs of nose wear and maximum flank wear shown in FIGS. 4 and 5, respectively, which are based on the results of the 600 sfm test shown in Table III.

A water soluble coolant, which may be used in these applications, is Cimtech 500. Cimtech 500 is a synthetic fluid concentrate for machining and stamping ferrous metals. It is supplied by Cincinnati Milicron Marketing Co., of Cincinnati, Ohio. It is typically diluted in water at a water to coolant ratio of 30:1 to 20:1 for machining applications.

TABLE III

METALCUTTING TEST RESULTS

| | Tool Life in Minutes | | |
|---|---|---|---|
| | 600 sfm | 800 sfm | 1,000 sfm |
| Invention | >5.0 | >1.5 | 1.5 BK |
| Prior Art | 2.5 FW | <0.5 BK | Not Run |

Conditions
  Operation: Turning
  Workpiece Material: Ti-6Al-4V titanium alloy (Annealed at 1300° F. for 2 hours and air cooled
  Cutting Speed: as noted above
  Feed: 0.005 inch/revoluation
  Depth of Cut: 0.050 inch
  Lead Angle: 45 degrees
  Rake Angle: −5 degrees back rake and −5 degrees side rake
  Cutting Fluid: Flood water soluble coolant diluted 20:1 with water
End of Life Criteria

| Breakage (BK) | |
|---|---|
| Flank Wear (FW) | ≧.030 inch |
| Maximum Flank Wear (MW) | ≧.040 inch |
| Nose Wear (NW) | ≧.040 inch |
| Depth of Cut Notching (DN) | ≧.080 inch |

It was further surprisingly found that the low fracture toughness, mentioned above, of the invention did not adversely affect the ability of the material to turn the above titanium alloy. It was further surprisingly found that the use of flood coolant did not cause the invention to break from excessive thermal shock. These results demonstrate that the present invention has at least twice the cutting edge lifetime of the prior art cemented carbide tools at machining speeds far beyond those recommended (i.e., <250 sfm) for uncoated carbide.

While uncoated cemented carbides can achieve similar lifetimes to those found for the present invention at lower speeds (<250 sfm), these lower speeds greatly reduce the metal removal rate, which is important in determining machining costs and machine availability.

Figure 6:
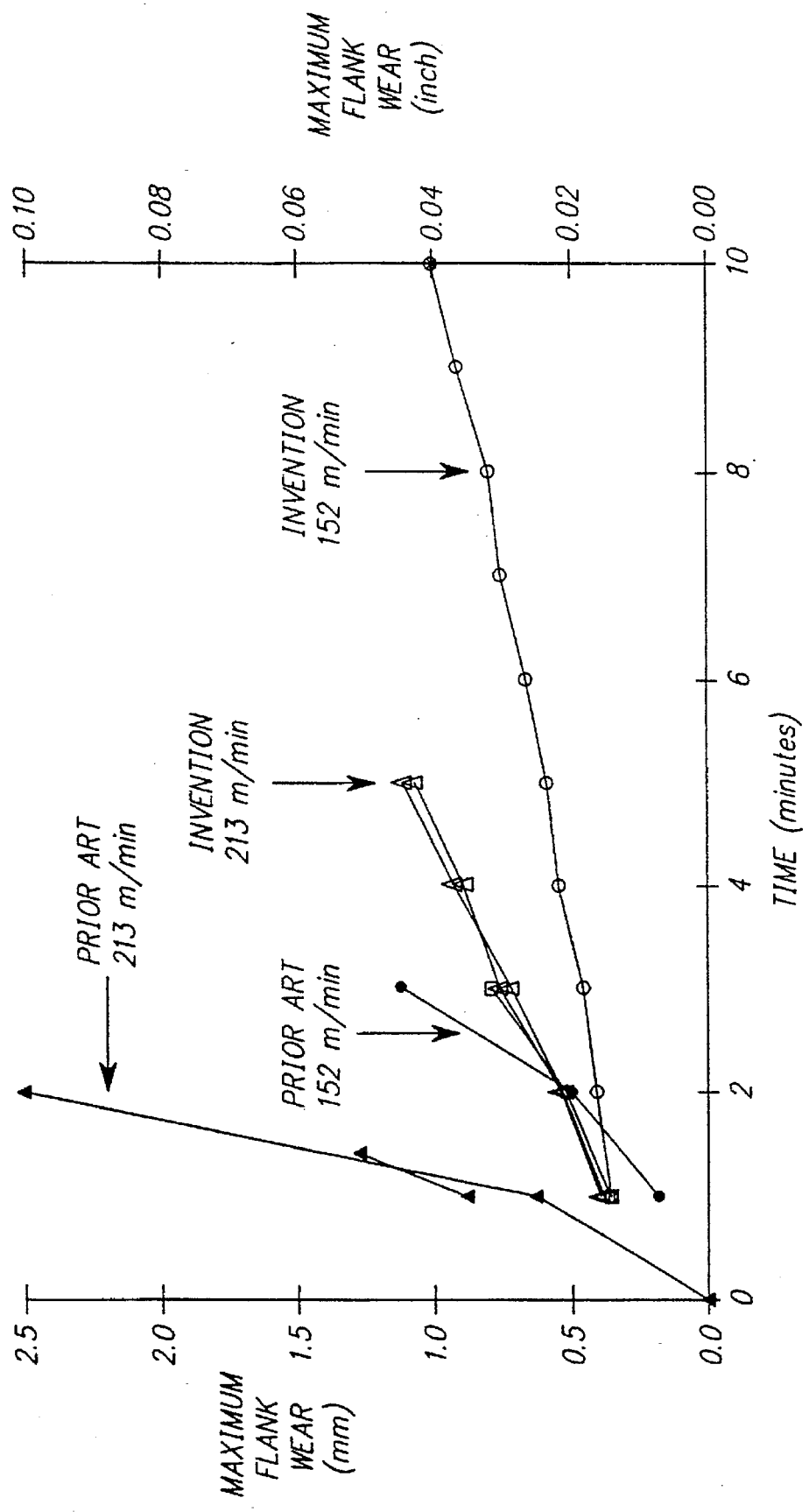
FIG. 6 is a graph of maximum flank wear as a function of cutting time in the machining of Ti-6Al-4V alloy for the present invention and the prior art uncoated cemented carbide at 152 and 213 surface meters/minute (500 and 700 surface feet/minute).

In another example, the composition used in Example 1 was blended in accordance with Example 1. After milling, the powders were dried, pelletized with a lubricant/fugitive binder (e.g., rosin/polyethylene glycol) and then uniaxially cold pressed to form green cutting inserts. The green inserts were heated in a vacuum up to about 460° C. to volatilize the lubricant and fugitive binder. Heating was the continued in one atmosphere of argon to a sintering temperature of about 2000° C., which was held for 60 minutes and then cooled to room temperature. The sintered inserts were then hot isostatically pressed at 1850° C. for 60 minutes under 15 ksi argon. Sintering and hot isostatic pressing were performed by placing the inserts on a bed of boron nitride setting powder. The inserts were then ground to final size. In this manner, RNGN-45T (0.002-0.004 inch×20° chamfer) style cutting inserts were fabricated. These cutting inserts were tested against prior art K313 grade cemented carbide cutting inserts in the RNGN-45 style with a sharp cutting edge in the turning of Ti-6Al-4V titanium alloy. The test conditions, as well as the results of these tests, are shown in Table IV and FIG. 6, and are summarized below:

A single test trial was run at 152 m/minute (500 sfm), comparing the pill pressed-sinter-Hipped inserts to the prior art K313 grade of cemented carbide. FIG. 6 is a plot of maximum flank wear. The important observation is that the wear rate for the present invention is relatively uniform through the end of life, at 10 minutes (based on 0.040 inch maximum flank wear). The 152 m/minute cutting speed is too high for the prior art, which had less than three minutes of tool life due to maximum flank wear exceeding 0.040 inch.

extreme localized wear and resulting rake and flank face chipping in less than one minute.

Based on the foregoing examples, it is clear that the pill pressed, sintered and Hipped cutting tools according to the present invention have the same capabilities for machining titanium based materials as the hot pressed cutting speeds which are significantly beyond the useful operating range of uncoated cemented carbide. It was further found that the present invention can withstand larger wear scars without experiencing the acceleration in wear rate that is typical of cemented carbide cutting tools.

It is further believed that the metalcutting performance of the present invention may be further improved, allowing longer cutting edge lifetime and/or higher machining speed capabilities, through the application of a refractory coating

TABLE IV

| | | MAXIMUM FLANK WEAR (inch) | | | |
|---|---|---|---|---|---|
| | Time | RUN 1 | | RUN 2 | |
| CONDITION | (minutes) | INVENTION | PRIOR ART | INVENTION | PRIOR ART |
| 500 sfm/ .0072 IPR/ .050"DOC/ Flood Coolant | | | | | |
| | 1 | .0151 | .0081 | | |
| | 2 | .0169 | .0203 | | |
| | 3 | .0182 | .0428 | | |
| | 4 | .0214 | | | |
| | 5 | .0223 | | | |
| | 6 | .0255 | | | |
| | 7 | .0286 | | | |
| | 8 | .0301 | | | |
| | 9 | .0345 | | | |
| | 10 | .0401 | | | |
| 700 sfm/ .0072 IPR/ .050" DOC/ Flood Coolant | | | | | |
| | 1 | .0163 | .0263 | .0170 | .0354 |
| | 2 | .0228 | .0984 | .0230 | .0510 |
| | 3 | .0285 | | .0296 | |
| | 4 | .0367 | | .0359 | |
| | 5 | .0445 | | .0434 | |
| 1000 sfm/ .005 IPR/ .050" DOC/ Flood Coolant | | | | | |
| | 1 | .0202 | .1436 | | |
| | 2 | broken | | | |

Two test trials were run at 213 m/minute (700 sfm) (see Table IV and FIG. 6). It was found that the pill pressed-sintered and Hipped inserts (Δ) had equal or better wear rate compared to the hot pressed inserts (◊) under these conditions. (The hot pressed insert (RNGN-43T) failed prematurely by cracking because it was too thin for this application.) At 700 sfm, the present invention maintains a uniform wear rate that is significantly superior to that produced in the prior art cutting tool. The 700 sfm cutting speed is also clearly out of the useful range of the uncoated carbide tested, which experienced extreme localized wear in less than two minutes.

In an attempt to determine the upper limit of the cutting speed for the present invention, a test was run at 100 sfm (see Table IV). The invention failed at two minutes due to breakage. The prior art cemented carbide tool experienced to the rake face, flank face and cutting edge. The coating may be applied by known PVD or CVD techniques now used to coat cutting tools. A refractory coating having one or more layers is preferably composed of one or more of the following refractory materials: alumina, and the borides, carbides, nitrides and carbonitrides of zirconium, hafnium and titanium, their solid solutions with each other and their alloys. It is further proposed that use of such a refractory coating may allow the use of higher levels of toughening agents or WC+CO to further improve the sinterability of the present invention, while minimizing the adverse impact of such increases on the wear rate when machining titanium alloys.

It is also contemplated that cutting inserts in accordance with the present invention may be fabricated with either a ground in, or molded, chipbreaker structure. Examples of chipbreaker structures which may be used herein are described in U.S. Pat. No. 5,141,367. Titanium alloy chips are notoriously hard to break. This may be partially due to the slow speeds used when uncoated cemented carbides are utilized to turn titanium alloys. It is our belief that the higher machining speeds now possible with the present invention, in combination with a chipbreaker structure, may lead to improved chip control during the turning of titanium alloys.

All patents and other publications referred to herein are hereby incorporated by reference in their entireties.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A method of fabricating a titanium boride based article of manufacture comprising the steps of:

adding 3.0–12 w/o of the sum of WC+Co and an effective amount of a grain growth inhibitor to $TiB_2$ powder and mixing the $TiB_2$, WC, Co, and said grain growth inhibitor together to form a mixture;

pressing the mixture to form a compact;

then sintering the compact at a pressure of up to 30,000 psi to produce a substantially dense article of manufacture having an average grain size of 8 μm or less.

2. A process for manufacturing a $TiB_2$ based ceramic comprising the steps of:

milling a powder containing at least 60 w/o $TiB_2$ powder with a WC-Co cemented carbide milling media for a time sufficient to produce a powder blend having about 2.5 to 12 w/o total of WC+Co picked up from attrition of the WC-Co cemented carbide milling media during said milling of said powder; and densifying the powder blend.

3. The process according to claim 2 wherein the total amount of WC+Co in said powder blend is about 4 to about 10 w/o.

* * * * *